Dec. 17, 1968     W. E. COWLEY     3,416,579
HACKSAW BLADE
Filed Feb. 2, 1966
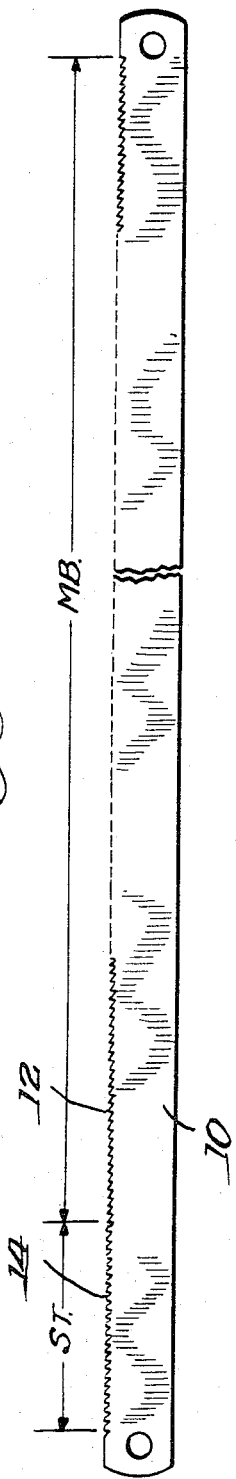
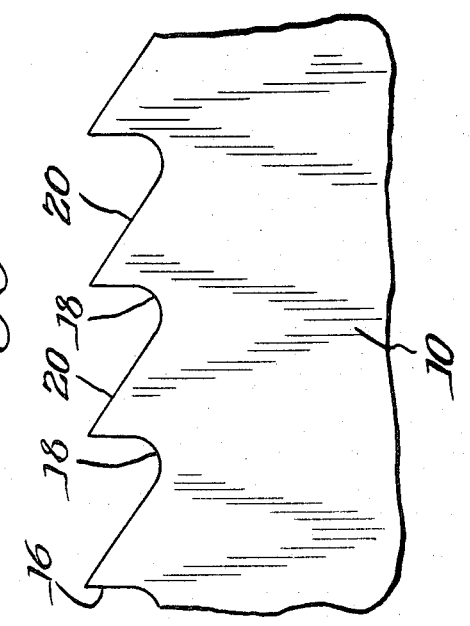
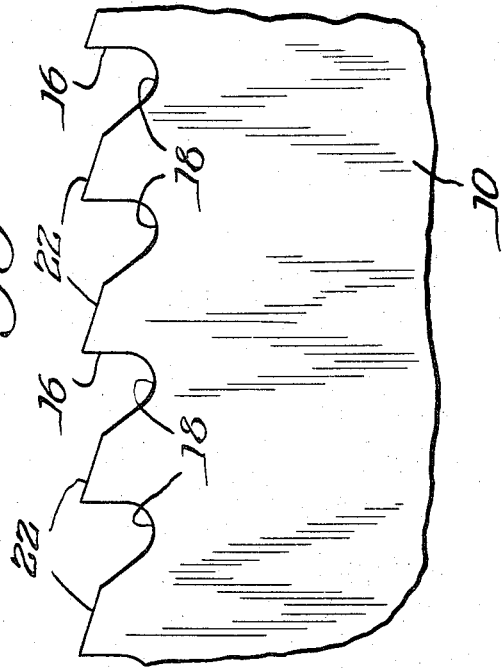
Inventor.
William E. Cowley.
By. Brown, Jackson, Boettcher & Dienner
Attys.

3,416,579
HACKSAW BLADE
William E. Cowley, Louisville, Ky., assignor to Vermont American Corporation, Louisville, Ky., a corporation of Kentucky
Filed Feb. 2, 1966, Ser. No. 524,449
8 Claims. (Cl. 143—133)

ABSTRACT OF THE DISCLOSURE

Hacksaw blades having starting teeth provided with a land on their rear edge which narrows the top width of the gullets therebetween to about 3/5 the pitch of the teeth, all the teeth of the blades having the same pitch, depth, shape of forward cutting edge and are spaced by gullets having a bottom edge of the same width and constant radius.

---

This invention relates to a hacksaw blade and more particularly to a configuration of the teeth of a hacksaw blade making possible a fast, easy, and free start when cutting thin materials.

The starting of a hacksaw blade has always been a problem. Anyone who has used a hacksaw has the same problem. To obtain the quickest and easiest cutting, one wants to use the coarsest teeth possible. However, such coarse teeth present a problem when starting the cut. Thin materials are partciularly difficult items on which to initiate a cut.

Several means have been used in the past to provide what may be called "starting teeth" on hacksaw blades. One known method is to provide a blade having teeth of a finer pitch on the starting end of the blade, such as on the first two or three inches, and teeth of a coarser pitch on the rest of the blade. Another method uses the same pitch along the entire length of the blade, but has a very shallow tooth for the first two or three inches. These known methods present problems when mass production is desired. In the first method it is more difficult to alternately set the teeth on a blade where the pitch varies. Normally, hacksaw blades are "roller" set. With variations in pitch, it becomes necessary to die set the teeth and die setting creates many problems if one desires to make the process automatic. The second method noted presents a problem during the heat treatment of hacksaw blades. The best quality blades have a spring temper body, and the cutting tips of the teeth are full hard. Normally, this harness does not and should not extend downwardly more than two-thirds of the depth of the teeth. When the soft line is in the last one-third of the teeth, they will not strip off as easily. It can be seen that if there are different heights of teeth on the blade, optimum heat treating becomes impractical.

In other known blades, tooth pitch and and depth remain constant. The cutting teeth in the main cutting portion of these blades have a zero hook. On the first few inches of the blade, however, the hook of the cutting edge is negative. The leading edges of teeth having a negative hook are at an oblique angle to the longitudinal axis of the blade and in a rearward direction toward the trailing edge of the blade. Negative hook provides easy starting on thick materials, that is, materials of more than one pitch thickness, but on thinner materials the teeth tend to dig in thus making the blade difficult to start.

Another known type of hacksaw blade is the "broach" blade. On this blade, the pitch gradually varies from fine on one end to coarse teeth on the other. Such a variable configuration of teeth pitch presents manufacturing problems and reduces the possibility of low cost mass production. The broach tooth blade would necessarily have to be die set, not rolled. In addition to the settin problems, the maintenance of milling cutters for variabl pitch teeth is a problem since cutters must always be pei fectly matched.

Basically, the present invention provides a hacksaw blade having teeth of constant pitch and depth, yet th cut on the starting teeth is controlled to provide eas starting on thin materials. This invention controls the cu on the starting teeth by having a land formed on the bacl angle portion of each tooth. The gullet radius at th bottom of each tooth is, however, retained constan along the length of the blade.

It thus has been an object of the present inventior to provide a saw blade for fast, easy and free cutting which is easy to start when cutting thin materials in partic ular.

Another object of this invention is to provide a saw blade having teeth which are easy to heat treat and tc set.

An additional object of the present invention is tc provide a hacksaw blade which is simple in constructior and may be readily mass produced at low unit cost.

Other objects and advantages of the invention will be shown in the following detailed description of a preferred embodiment thereof, as illustrated in the accompanying drawing in which:

FIG. 1 is an elevational view of a foreshortened portion of a hacksaw blade embodying novel starting teeth and cutting teeth;

FIG. 2 is a fragmentary elevational view, greatly enlarged, illustrating in detail the novel starting teeth having a land formed on a back angle portion of each tooth; and FIG. 3 is a fragmentary elevational view, greatly enlarged, illustrating the cutting teeth of the hacksaw blade.

Referring now to FIG. 1, a starting portion of a hacksaw blade 10 is shown having an array of relatively coarse cutting teeth 12 ranging along the cutting edge of a main body portion MB and an array of starting teeth 14 aligned forward from the cutting teeth on the starting end ST of the blade.

As shown in FIGS. 2 and 3, both the novel starting teeth and the coarse cutting teeth have a cutting edge 16 having zero hook, that is, the cutting edge has no inclination from the perpendicular as the edge relates to the lengthwise axis of the blade. The pitch and depth of the teeth are uniform along the entire length of the blade. The bottom of the gullet 18 between all adjacent teeth is kept at a constant radius.

In FIG. 3, a back angle edge portion 20 of each cutting tooth is shown at an angle of negative slope to the lengthwise axis of the blade. The back angle edge portion begins at the tip of the cutting edge 16 and inclines downwardly and away therefrom to intersect with the gullet 18. In the illustrated embodiment the back angle edge portion 20 of the cutting teeth has a negative slope at 35°.

In the illustrated embodiment of the starting teeth shown in FIGURE 2 a back land 22 is formed on a back angle edge of each starting tooth. Each land 22 is at a back clearance angle oblique to the lengthwise axis of the blade. The obliquity of each land is inclined in a rearward and downward direction from the starting end of the blade, and intersects the gullet behind it. The lands may be disposed from a plane defined by the tips of the cutting edges by an angle between 7° and 18°. The variable length of the land determines the width of the gullet opening. By lengthening the lands, the width of the gullets is reduced, whereby it is more difficult for thin materials to enter between the teeth and hinder smooth cutting. For the smoothest cutting, the gullet width to pitch ratio should be approximately 3 to 5 and the length of the back lands 22 should not exceed the relationship $$\frac{(A-2R)}{\cos 2}$$

whence A is the pitch, R is the gullet radius, and 2 is the back clearance angle.

An example of an embodiment of the present invention may be based on a selected pitch of eighteen teeth per inch, wherein the cutting edges and tips thereof are .055 inch apart along the entire length of the blade. The depth of teeth from the cutting tip to the bottom of the gullet is approximately .0287 inch. If one wished to saw any material less than .055 inch thick, without the starting teeth of this invention, material could drop between the teeth and it would be hard to start. Further, on starting a material of more than one pitch, such as .100 inch thick, a tooth could "dig in" due to the relatively steep back angle on the tooth. By providing starting teeth having lands formed thereon and disposing the lands at an angle to the lengthwise axis of the blade, "dig in" can be controlled and materials do not enter between the teeth. The land should be disposed from the plane defined by the cutting tips by a clearance angle. In our experiments thus far, a clearance angle between 7° and 18° below the plane and toward the trailing end of the blade provides a smooth entering cut. The length of the land from the cutting tip to a point where it intersects the gullet may be varied and thus the actual open width of the gullet in back of the land can be controlled. In the embodiment shown here, the land on each starting tooth is disposed at an angle of 10° and is approximately .025" long, thus providing a gullet opening of approximately .030". The angle of the back edge portion of the cutting teeth is 35°, and the gullet comprises the full pitch width. It is obvious that for very smooth cuts through thin materials, the entire length of the cutting edge of the blade may be provided with an array of the novel starting teeth.

The present invention provides an improved hacksaw blade, having a land formed on a back edge portion of the starting teeth. By regulating the angular disposition and length of each land, a saw blade is provided which easily cuts thin materials yet is simple enough in construction to be adapted to mass production techniques.

Although I have described my invention with respect to certain specific embodiments thereof, I do not wish to be thereby limited, as various modifications of my invention are intended to be encompassed within its true spirit and scope as indicated by the following claims.

I claim:
1. A hacksaw blade which comprises an array of teeth ranging along the cutting edge thereof, each of said teeth having a leading edge of the same shape and inclination and a trailing back edge, each pair of teeth being separated by a gullet having a rounded bottom edge of a radius R into which the trailing back edge of the preceding tooth and the leading edge of the succeeding tooth merge, the first several teeth thereof constituting starting teeth, each of said starting teeth having a land formed on their back edge which extends from the cutting tip of the tooth at a back clearance angle oblique to the plane defined by the cutting tips and a more sharply declined edge portion which extends from said land and merges into the bottom edge of the gullet, said land being of a length limited by the equation

$$\frac{A-2R}{\cos \alpha}$$

in which A is the pitch, R is the gullet radius and $\alpha$ is the back clearance angle such that the gullet width between the starting teeth is at least 2R and less than the gullet width between the cutting teeth, the pitch and depth of all the teeth, including said first several starting and succeeding teeth, being the same.

2. A hacksaw blade as defined in claim 1 wherein the obliquity of said land is from 7° to 18°.

3. A hacksaw blade as defined in claim 1 wherein a ratio established by the relationship of the gullet width of the starting teeth to the pitch is approximately 3 to 5.

4. A hacksaw blade as defined in claim 3 wherein the obliquity of each land is 10°.

5. A hacksaw blade which comprises an array of cutting teeth preceded by an array of starting teeth ranging along one edge thereof, each of said cutting and starting teeth having a cutting edge of zero hook and a trailing back edge, the pitch and depth of all the teeth being the same, and each pair of teeth being separated by a gullet having a rounded bottom edge of a radius R into which the trailing edge of the preceding tooth and the cutting edge of the succeeding tooth merge, the trailing back edge of the cutting teeth each being steeply declined along the full length thereof, and the trailing back edge of the starting teeth each having a more steeply declined first part which merges with the bottom edge of the gullet and a more shallow declined land which extends from adjacent the cutting tip of the starting tooth to a junction with said more steeply declined first part of its trailing back edge, said junction being spaced from the cutting edge of the succeeding tooth by a distance which is at least twice R and is less than the width of the gullets between the cutting teeth.

6. A hacksaw blade as defined in claim 5 wherein the land is declined at approximately 6° to 18°.

7. A hacksaw blade as defined in claim 5 wherein the back land length of the starting teeth is limited by the equation $$\frac{A-2R}{\cos \alpha}$$

in which A is the pitch, R is the gullet radius and $\alpha$ is the back declination angle of the lands.

8. A hacksaw blade as defined in claim 6 wherein a ratio established by the relationship of a gullet width to the pitch on the starting teeth is approximately 3 to 5.

References Cited

UNITED STATES PATENTS

| | | | |
|---|---|---|---|
| 1,328,982 | 1/1920 | Calkins | 143—133 |
| 2,682,098 | 6/1954 | Wilcox | 143—133 X |

DONALD R. SCHRAN, *Primary Examiner.*

U.S. Cl. X.R.

29—95